United States Patent
Kloess et al.

(10) Patent No.: US 6,357,618 B1
(45) Date of Patent: Mar. 19, 2002

(54) FUEL TANK ASSEMBLY FOR A MOTOR VEHICLE

(75) Inventors: Michael Kloess; Albert Boecker, both of Karlsruhe (DE)

(73) Assignee: TI Group Automotive Systems Technology Center GmbH, Rastatt (DE)

(*) Notice: Subject to any disclaimer, the term of this patent is extended or adjusted under 35 U.S.C. 154(b) by 0 days.

(21) Appl. No.: 09/633,442

(22) Filed: Aug. 7, 2000

(30) Foreign Application Priority Data

Aug. 16, 1999 (DE) .......................................... 199 38 131

(51) Int. Cl.[7] .............................................. B65D 25/00
(52) U.S. Cl. ........................ 220/562; 220/86.1; 220/319
(58) Field of Search ................................. 220/562, 319, 220/324, 345, 86.1, 86.2

(56) References Cited

U.S. PATENT DOCUMENTS

| | | | |
|---|---|---|---|
| 2,900,103 A | * 8/1959 | Taylor, III et al. | 220/86.1 X |
| 3,696,962 A | * 10/1972 | Fehres et al. | 220/319 |
| 4,572,397 A | * 2/1986 | Arens | 220/86.1 X |
| 5,582,318 A | * 12/1996 | Dietrich | 220/319 |
| 5,881,898 A | * 3/1999 | Irwin et al. | 220/319 |

* cited by examiner

*Primary Examiner*—Steven Pollard
(74) *Attorney, Agent, or Firm*—Reising, Ethington, Barnes, Kisselle, Learman & McCulloch, P.C.

(57) ABSTRACT

A cover element and clamping ring are mountable on and sealable to close a tubular portion surrounding an access opening in a wall portion of a container of a fuel tank assembly for a motor vehicle. The tubular portion is contiguous with and projects outward from the wall portion, defines the opening in the wall portion, and has a contoured bead which projects radially outward from the projected end of the tubular portion. The cover element is demountably situated on the projected end of the tubular portion and is thereby removably situated over the opening in the container. A sealing ring is removably disposed between the cover element and the tubular portion of the container. The clamping ring is removably snapped onto the contoured bead of the tubular portion of the container. In such a configuration, the sealing ring is cooperatively clamped and sealingly disposed between the cover element, the tubular portion of the container, and the clamping ring whenever the clamping ring is snapped onto the contoured bead of the tubular portion of the container. In one embodiment, the cover element includes a fuel pump module with a conduit for transferring fuel from the container. In another embodiment, the cover element includes a filler pipe for transferring fuel into the container.

20 Claims, 2 Drawing Sheets

FUEL TANK ASSEMBLY FOR A MOTOR VEHICLE

REFERENCE TO RELATED APPLICATIONS

Applicants claim priority of German Application Ser. No. 199 38 131.3 filed Aug. 16, 1999.

FIELD OF THE INVENTION

The invention relates to a fuel tank for a motor vehicle and, more particularly, to a fuel tank assembly which structurally accommodates a fuel pump module and/or a fuel filler pipe.

BACKGROUND OF THE INVENTION

Presently, a fuel tank or container which is incorporated into a fuel tank assembly of an automotive vehicle may be made of plastic. Furthermore, due to increasingly strict regulations concerning the permeation and escape of fuel and fuel vapors from fuel containers, the structural design of the mounting connection between the fuel container and, for example, a fuel pump module or a fuel filler pipe is particularly critical. In the particular case of a fuel pump module, it is necessary that the fuel container includes an opening in its container wall for physically accommodating and structurally mounting the fuel pump module in the fuel container. More particularly, a cover element which is mounted in the opening of the fuel container carries an electric fuel pump module such that the cover element includes the connectors and conduits necessary for supplying electricity to the fuel pump and transferring (that is, pumping) fuel from the container to the engine. These structural parts may include, for example, a fuel pump, a fuel level indicator, and/or ducts or conduits for transferring fuel from the container and to the engine. In addition, it is also necessary that the fuel pump module be specifically mounted to the fuel container so as to be removable for service and repair purposes. To satisfy all the necessary requirements, various solutions have been proposed in the art.

In a first proposed solution, for example, threads are formed during a blow-molding process on a tubular portion which defines an opening in a plastic fuel container. A nut is engaged therewith for urging the cover element against the tubular portion. For sealing purposes, a sealing ring is inserted between the threads and the cover element during assembly. This solution, however, suffers from a plurality of drawbacks. First of all, manufacturing difficulties typically arise because the threaded portion must necessarily include a certain minimum number of supporting threads and, therefore, must extend relatively far beyond the fuel container wall. This may cause material flow problems during blow molding so that a uniform wall thickness of a threaded portion cannot be ensured. In addition, this may also damage the closure when it is subject to substantial loads so that fuel may leak from the container. Furthermore, the cost of assembly is also undesirably substantial because an assembly person has to tighten the nut with a precise, predetermined amount of applied torque. That is, on the one hand, the applied torque should not be too high in order not to damage the threaded portion of the nut. On the other hand, the applied torque should not be too small in order to ensure tightness and sealing of the closure. Nevertheless, even when assembly pursuant to this first solution is properly carried out, the torque and tightness of the nut eventually change over time due to aging. Furthermore, since the fuel container is situated within the vehicle at a location which is not easily accessible, tightness of the closure of the fuel system at such a location typically is neither properly monitored nor timely adjusted and, instead, is not monitored and is adjusted only if the fuel pump module is removed and serviced or replaced. As a result, undesired fuel permeation often occurs under this first solution.

In a second proposed solution, a metallic ring is inserted into the blow mold during the manufacturing process of a conventional closure system. In a further step of the blow molding process, the metallic ring is embedded in the material of the container. In this way, the metallic ring extends partially beyond the wall of the fuel container and thereby forms part of a bayonet joint. While this particular solution enables a relatively small assembly height, additional steps in the manufacturing process pursuant to this solution are undesirably required. Furthermore, such a proposed closure system also does not properly satisfy all safety requirements. For example, a fuel container according to such a proposed closure system may be subjected to an extremely high shock load during a car accident. Such a shock load may cause the interior pressure of the fuel container to increase abruptly, even though the container may be deformable to a certain extent. In light of such, the interior pressure resistance of a closure system is a feature which is important to safety. However, in this proposed closure system, it has been found that a sudden increase in the internal pressure may cause the sealing ring to be urged from its seat so that fuel may leak from the container. Another feature important to safety is the cold flow toughness of a closure system which is tested at a temperature of −40 degrees Celsius, and such a low temperature may result in brittleness of the closure system material. After testing, it was found that the closure system according to the second solution often failed this low-temperature test when thereafter being subjected to room temperature despite the great strength inherent in the closure system. In particular, the differences in stiffness and coefficients of thermal expansion between the metallic ring and the surrounding plastic material resulted in reduced deformation characteristics and eventually to the metallic ring being broken out of the container wall such that the fuel container was irrevocably damaged.

A modification of the above-described second solution consists of the metallic ring, first, being embedded in a separate plastic ring. Thereafter, the resulting ring unit is fixed to the container wall in the area of the opening by plastics welding after the container has been blow-molded. While this particular modification helps facilitate the blow molding method solution, the modification undesirably requires an additional step for mounting the unit comprising the metallic ring and the plastic ring. In addition, more space is required for implementing this modification. Furthermore, with regard to the internal pressure resistance and the cold flow resistance problems described above, these problems are still present even upon implementing this modification.

A third proposed solution, which offers good permeation resistance, involves implementing an injection molding process prior to the blow molding of the container. In the injection molding process, a metallic ring is enclosed, at least partially, by plastic material. The resulting prefabricated part is then heated so that the plastic surface melts. Next, the part is integrated in the blow molding process which results in a connection between the prefabricated part and the material of the container, similar to that of a plastics welding operation. This particular solution, however, involves an even more complicated manufacturing process than the processes associated with the above described solutions. Furthermore, the above-described problems with respect to the internal pressure resistance and cold flow resistance are also present in this third solution, even despite the reduced permeability attributable to the plastics/metal material combination.

The DE-A 196 27 395 disclosure describes a fuel container, of the general above-identified type, wherein a tubular portion defining a container opening is provided with a flange. The flange forms an abutment surface for accommodating a respective counter-surface of a cover element. The abutment surface of the flange includes an annular groove which receives an O-ring seal. Mounting of the cover element is accomplished by way of a clamping ring which engages behind the flange of the tubular portion. In this way, when the cover element is fully assembled, the cover element is mounted such that it directly contacts the abutment surface of the flange and is supported thereby. The groove in the flange is dimensioned such that the O-ring seal is fully received therein. However, a drawback of this particular solution is that it only provides for axial sealing. Radial sealing under this solution is not provided. In addition, the process of mounting the clamping ring requires skilled personnel because, on the one hand, the selected closing force must be sufficiently substantial so that the respective abutment surfaces of the flange and of the cover element actually engage each other. On the other hand, selecting an excessive closing force may damage the closure system. Furthermore, this particular closure system does not provide for compensation of the setting of the seal, and as a result, permanent permeation resistance cannot be ensured with this closure system.

In view of the above, there is a present need in the art for a fuel container which is manufactured by blow molding in a simple manner, which is easily and reliably assembled by unskilled personnel, and which meets maximal permeability and industry safety requirements.

SUMMARY OF THE INVENTION

A cover element and clamping ring are mountable on and sealable to close a tubular portion surrounding an access opening in a wall portion of a container of a fuel tank assembly for a motor vehicle. The tubular portion is contiguous with the wall portion and projects outward from the wall portion so as to define the opening in the wall portion. The tubular portion has a contoured bead which projects radially outward from the projected end of the tubular portion. The cover element is demountably situated on the projected end of the tubular portion and is thereby removably situated over the opening in the container. A sealing ring is removably disposed between the cover element and the tubular portion of the container. The clamping ring is removably snapped onto the contoured bead of the tubular portion of the container. In such a configuration, the sealing ring is cooperatively clamped and sealingly disposed between the cover element, the tubular portion of the container, and the clamping ring whenever the clamping ring is snapped onto the contoured bead of the tubular portion of the container.

In a preferred embodiment of the present invention, the container comprises blow-molded, thermoplastic material. In this way, the contoured bead is preferably made integral with the projected end of the tubular portion, and the tubular portion of the container is preferably made integral with the wall portion of the container. Most preferably, the ratio of the axial length of the tubular portion to the radial thickness of the contoured bead falls within a range from about 1:2 to about 3:1. The sealing ring, in contrast, preferably comprises elastomeric material and is thereby adapted to swell when fuel is absorbed by the sealing ring. Furthermore, the sealing ring preferably has a substantially L-shaped cross-section.

Preferably, the cover element has a cylindrical portion capable of extending into the opening of the container such that the cylindrical portion is coaxially situated within the tubular portion of the container. In addition, the cover element preferably has a flange projecting radially outward from the cylindrical portion. In this way, when the clamping ring is snapped onto the contoured bead of the tubular portion, the sealing ring is cooperatively clamped and sealingly disposed between the cylindrical portion of the cover element, the tubular portion of the container, and the clamping ring. At the same time, the flange of the cover element is cooperatively clamped between the sealing ring and the clamping ring. In a highly preferred embodiment, the cover element includes either a filler pipe for transferring fuel into the container or a fuel pump module with a conduit for transferring fuel from the container.

Further in a preferred embodiment of the present invention, the clamping ring has a lower portion and an inclined surface defined in the inner radial periphery of the lower portion. In this way, the lower portion of the clamping ring can initially slip over the contoured bead of the tubular portion so as to ultimately facilitate the snapping of the clamping ring onto the contoured bead of the tubular portion. In addition, the clamping ring preferably has an annular groove defined in the inner radial periphery of the clamping ring for snapping the clamping ring onto the contoured bead of the tubular portion in a complementary fashion. Further, the clamping ring preferably has a contact surface including a chamfer for cooperatively clamping the flange of the cover element. In this way, when the clamping ring is snapped onto the contoured bead of the tubular portion, the chamfer causes the clamping force applied by the clamping ring to increase when the cover element experiences radial expansion and/or when the sealing ring experiences swelling. Still further, the clamping ring preferably has a cross-section including at least one separation slit defined therethrough. Each separation slit preferably is substantially radially aligned and serves to facilitate the initial slipping of the lower portion of the clamping ring over the contoured bead of the tubular portion.

Preferably, the fuel tank assembly further includes a fastenable strap which removably encircles the outer radial periphery of the clamping ring. The strap serves to secure the clamping ring once the clamping ring is snapped onto the contoured bead of the tubular portion. To accommodate the strap, the clamping ring preferably has an annular groove defined in the outer radial periphery of the clamping ring for matingly receiving the fastenable strap.

To prevent rotational movement, the cover element preferably has an integral projection received in assembly in a complementary recess in the inner radial periphery of the clamping ring.

Objects, features, and advantages of this invention include providing a fuel tank assembly which is simple and economical to manufacture and assemble, has an improved sealing capability that substantially prevents the undesired permeation of fuel and fuel vapors in compliance with industry safety regulations, and is compact, rugged, durable, reliable, of relatively simple design, and in service has a long useful life.

BRIEF DESCRIPTION OF THE DRAWINGS

These and other objects, features, and advantages of this invention will be apparent from the following detailed description of the preferred embodiments and best mode, appended claims, and accompanying drawings in which:

DETAILED DESCRIPTION OF THE PREFERRED EMBODIMENT

Structure of the Preferred Embodiment

Figure 1:
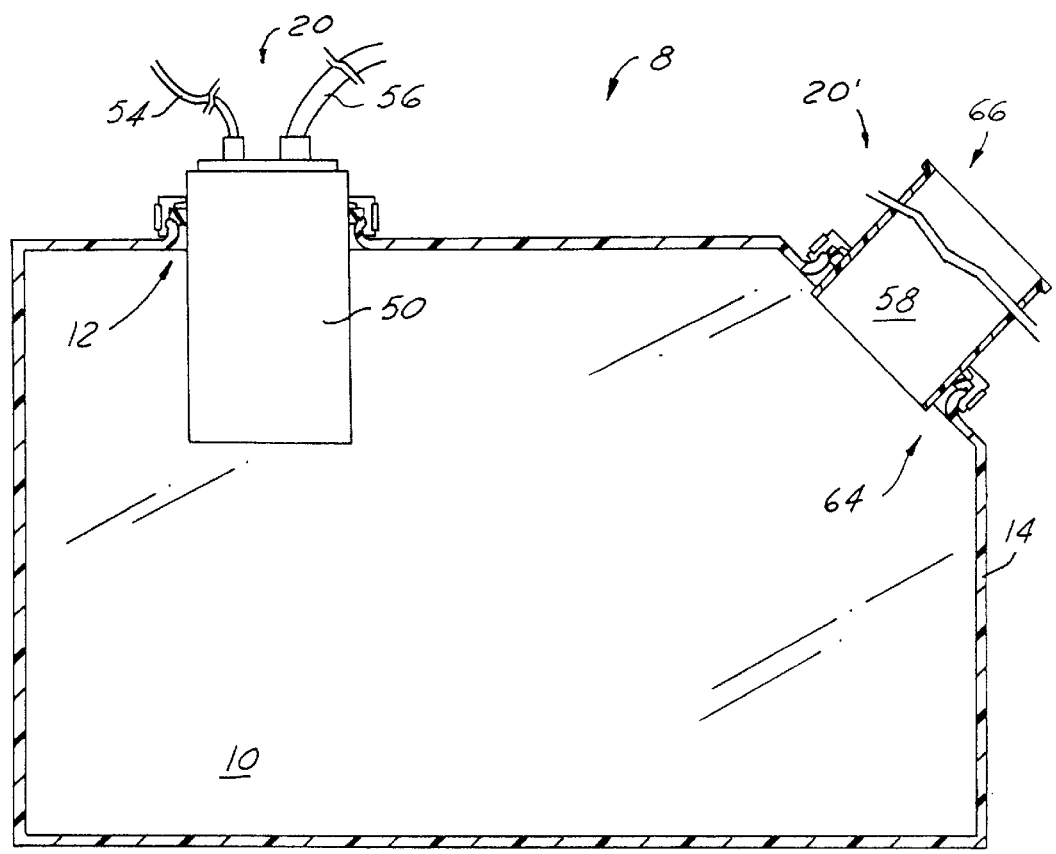
FIG. 1 is a partial, sectional side view of a fuel tank assembly according to the present invention, wherein a first cover element including a fuel pump module and a second cover element including a fuel filler pipe are mounted in the wall openings of a fuel container.

FIG. 1 is a partial, sectional side view of a fuel tank assembly 8 for a motor vehicle according to the present invention. The fuel tank assembly 8 has a first cover element 20 with a fuel pump module 50 integral therewith and mounted in an opening 12 of a wall portion 14 of a fuel container 10. The container 10 preferably comprises a blow-molded, thermoplastic material. The fuel pump module 50 has a power cord 54 connected thereto to provide electrical power to the fuel pump module 50 for operation. The fuel pump module 50 also has a fuel outlet conduit and tube 56 for transferring fuel from the container 10 to a motor vehicle engine (not shown). It is to be understood that the fuel pump module 50 may include, for example, a float apparatus (not shown) for indicating the level of fuel in the container 10, and also a hose (not shown) for drawing fuel from the interior of the container 10. In addition, the fuel tank assembly 8 also has a second cover element 20' with an integral fuel filler pipe 58, similarly mounted in an opening 64 of the wall portion 14 of the fuel container 10. The filler pipe 58 has an external opening 66 which permits fuel to be transferred into the container 10 via the filler pipe 58. The external opening 66 of the filler pipe 58 can be tightly closed and sealed with, for example, a cap (not shown).

Figure 2:
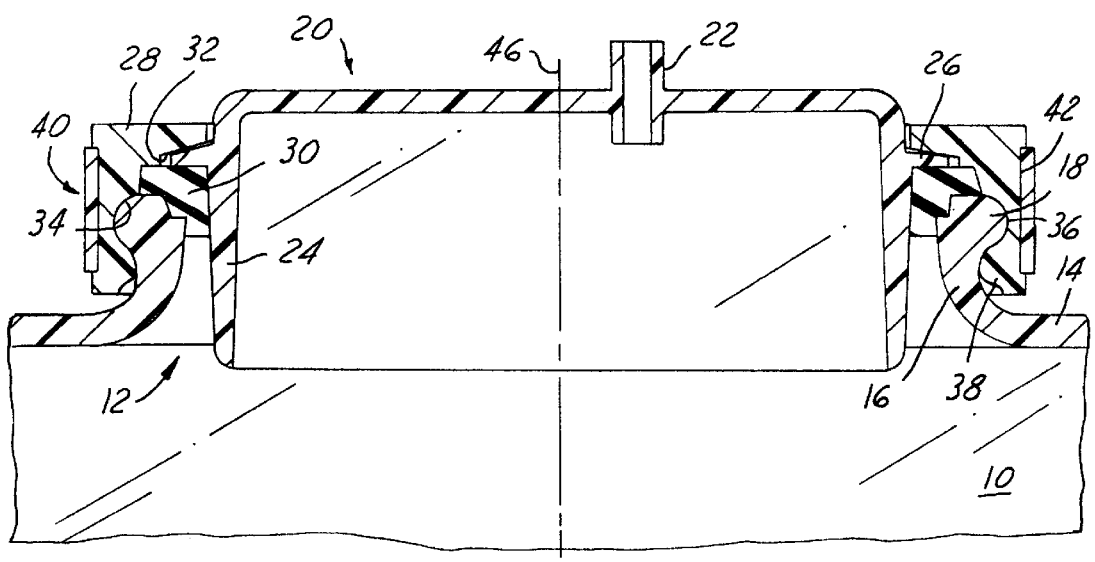
FIG. 2 is a fragmentary and enlarged sectional side view of the fuel tank assembly in FIG. 1 which particularly highlights the first cover element without the fuel pump module, wherein the cover element is sealingly mounted and clamped onto a tubular portion of the fuel container with a clamping ring.

FIG. 2 illustrates a stripped-down version of the first cover element 20 without the fuel pump module 50 being attached thereto. The cover element 20 is sealingly mounted over the opening 12 and is clamped onto a tubular portion 16 of the fuel container 10 with a clamping ring 28. As FIG. 2 illustrates, the tubular portion 16 of the container 10 defines the opening 12 in the wall portion 14 and also projects outward from the wall portion 14. As such, the tubular portion 16 is contiguous, and preferably integral, with the wall portion 14 and has a contoured bead 18 projecting radially outward from its projected end. The cover element 20 is demountably situated on the projected end of the tubular portion 16 and is thereby removably situated over the opening 12 defined in the wall portion 14 of the container 10. A sealing ring 30, having a substantially L-shaped cross-section, is removably disposed between the cover element 20 and the tubular portion 16 of the container 10. The clamping ring 28 is removably snapped onto the contoured bead 18 of the tubular portion 16 of the container 10. In such a configuration, the sealing ring 30 is cooperatively clamped and sealingly disposed between the cover element 20, the tubular portion 16 of the container 10, and the clamping ring 28 whenever the clamping ring 28 is snapped onto the contoured bead 18 of the tubular portion 16 of the container 10.

With further regard to FIG. 2, the cover element 20 generally covers the opening 12 and also thereby serves as a general structure for mounting and/or connecting, for example, power cords, electrical wires, fuel pipes, fuel conduits, a fuel pump module, and/or a fuel level indicator. In FIG. 2, a fuel conduit 22 is defined in the cover element 20 which corresponds with the fuel tube 56 in FIG. 1 for transferring fuel from the container 10 to a motor vehicle engine. The cover element 20 has a cylindrical portion 24 which, when the cover element 20 is mounted as in FIG. 2, the cylindrical portion 24 extends into the opening 12 of container 10 such that the cylindrical portion 24 is coaxially situated within the tubular portion 16 of the container 10 with respect to an imaginary axis 46. In addition, the cover element 20 also has a flange 26 which is integral with the cylindrical portion 24 and which extends substantially radially outward and beyond the cylindrical portion 24. The flange 26 forms an abutment surface for receiving the clamping ring 28. Furthermore, the flange 26 engages the sealing ring 30 which is disposed in a gap between the cover element 20, the clamping ring 28, and the tubular portion 16. In this way, when the clamping ring 28 is snapped onto the contoured bead 18 of the tubular portion 16, the sealing ring 30 is cooperatively clamped and sealingly disposed between the cylindrical portion 24 of the cover element 20, the tubular portion 16 of the container 10, and the clamping ring 28. In addition, the flange 26 of the cover element 20 is also cooperatively clamped between the sealing ring 30 and the clamping ring 28.

At its contact surface, the clamping ring 28 has an engagement chamfer 32 which contacts and cooperatively clamps the flange 26 of the cover element 20. In this way, when the clamping ring 28 is snapped onto the contoured bead 18 of the tubular portion 16, the chamfer 32 causes the clamping or closure force applied by the clamping ring 28 to increase when the cover element 20 experiences radial expansion and/or when the sealing ring 30 experiences swelling. In addition, the clamping ring 28 has an annular groove 34 defined in its inner radial peripheral surface which is complementary to an annular snapping surface 36 defined by the contoured bead 18 of the tubular portion 16. In order to further facilitate snapping of the clamping ring 28 onto the contoured bead 18 during assembly, the clamping ring 28 has an inclined surface 38 defined in the inner radial periphery of the lower portion of the clamping ring 28. More particularly, the inclined surface 38 of the clamping ring 28 enables the lower portion of the clamping ring 28 to be initially slipped over the contoured bead 18 of the tubular portion 16 so as to ultimately facilitate the snapping of the clamping ring 28 onto the contoured bead 18 of the tubular portion 16.

Figure 3:
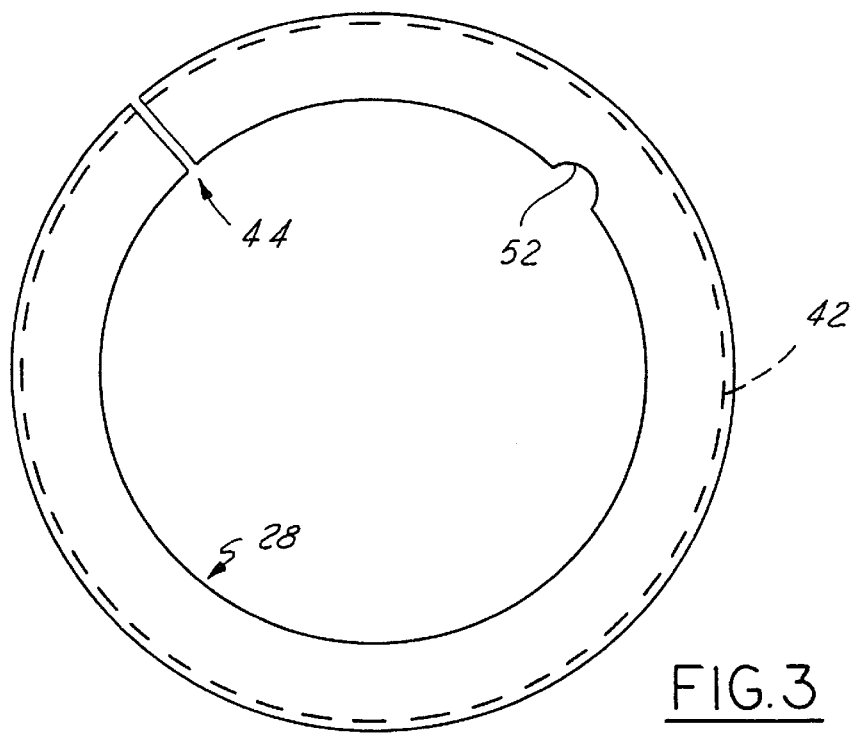
FIG. 3 is a top view of the clamping ring in FIG. 2, wherein the clamping ring is slightly pulled apart to highlight a separation slit defined through its cross-section.

FIG. 3 is a top view of the clamping ring 28 in FIG. 2. In FIG. 3, the clamping ring 28 is slightly pulled apart to highlight a separation slit 44 which is defined through its cross-section. In a most preferred embodiment, the separation slit 44 is substantially radially aligned. In general, the separation slit 44 serves to facilitate the initial slipping of the lower portion of the clamping ring 28 over the contoured bead 18 of the tubular portion 16 so that the clamping ring 28 can ultimately be snapped onto the contoured bead 18.

Figure 4:
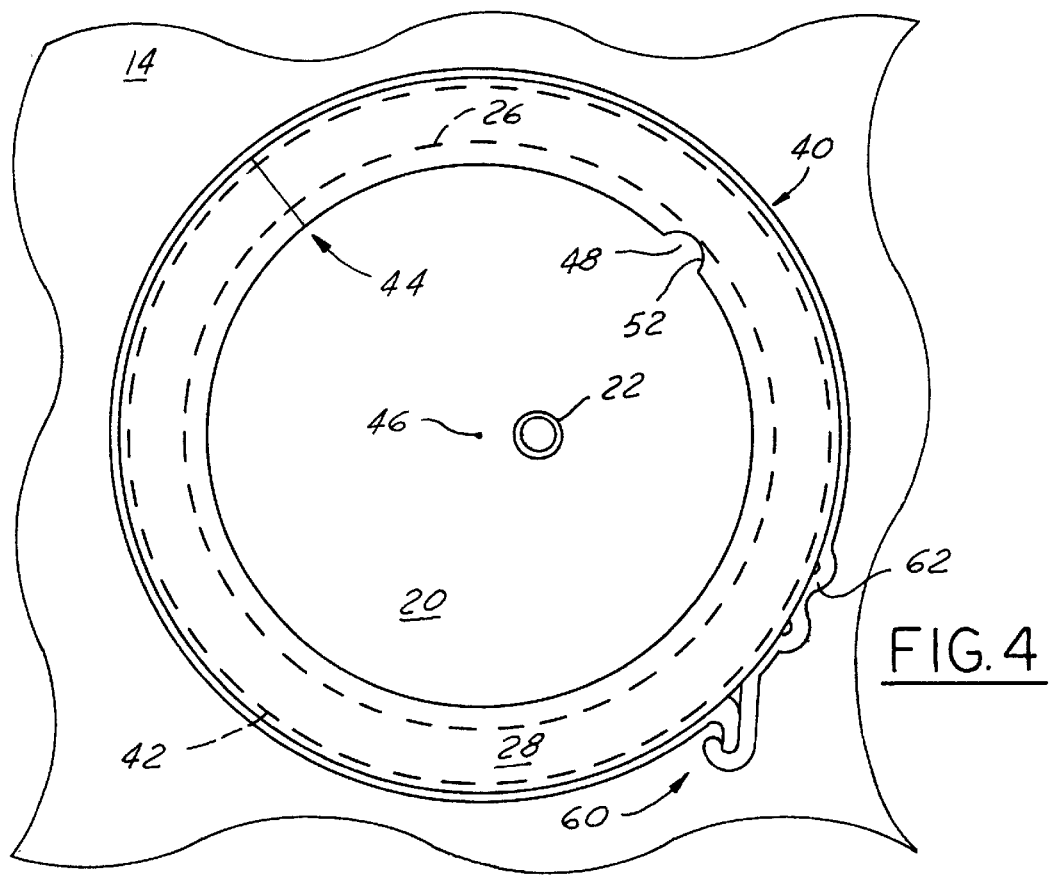
FIG. 4 is a top view of the fuel tank assembly in FIG. 2, wherein a strap encircling and securing the outer radial periphery of the clamping ring is particularly highlighted.

As illustrated in FIG. 2, to additionally secure the clamping ring 28 when the clamping ring 28 is snapped onto the contoured bead 18 of the tubular portion 16 and thereby increase or adjust the closure force applied by the clamping ring 28, the fuel tank assembly 8 includes a resilient, fastenable strap 40 which removably encircles the outer radial periphery of the clamping ring 28. FIG. 4 is a top view of the fuel tank assembly 8 in FIG. 2, wherein the strap 40 is particularly highlighted. As illustrated, the strap 40 has a serpentine portion 62 which can be elastically extended so that the strap 40 tightly encircles the clamping ring 28 and so that the two ends of the strap 40 are tightly connected together as a clasp 60. The clamping ring 28 preferably has an annular groove 42 defined in the outer radial periphery of the clamping ring 28 for matingly receiving the strap 40. In this manner, the strap 40 is retained by the clamping ring 28 so as to prevent both axial displacement and loss of the strap 40.

When the fuel tank assembly 8 is properly assembled, the sealing ring 30 sealingly engages the tubular portion 16, the clamping ring 28, and the cylindrical portion 24 of the cover element 20. More particularly, in an axial direction, the sealing ring 30 sealingly engages sealing surfaces provided on the flange 26, a lower axial surface of the clamping ring 28, and the contoured bead 18 of the tubular portion 16. In a radial direction, the sealing ring 30 sealingly engages sealing surfaces provided on the outer radial peripheral surface of the cylindrical portion 24 of the cover element 20, the inner radial peripheral surface of the clamping ring 28, and the tubular portion 16. In this manner, reliable sealing in both the axial and radial directions is provided by the fuel tank assembly 8.

The sealing ring 30 comprises a sealing material, preferably an elastomeric material, which swells, due to absorption, when exposed to fuel and/or fuel vapors. In order to compensate for such volume increase when exposed to such vapors, the sealing ring 30 is left partially physically unrestricted and is permitted to expand toward the interior of the container 10 through a gap between the cylindrical portion 24 of the cover element 20 and the tubular portion 16. Such a gap also allows the sealing ring 30 to physically compensate for small variations in the closure pressure exerted by both the clamping ring 28 and the strap 40. In this manner, proper sealing in both the axial and the radial directions is not adversely affected, either by the swelling or by the drying (which causes shrinkage) of the sealing ring 30.

Referring again to FIG. 3 and to FIG. 4, the cover element 20 has a projection 48 which is integral with the outer radial periphery of the cover element 20. In addition, the clamping ring 28 has a complementary recess 52 defined in the inner radial periphery of the clamping ring 28. Given such, the projection 48 of the cover element 20 and the recess 52 of the clamping ring 28 fit snugly together when the clamping ring 28 is snapped onto the contoured bead 18 of the tubular portion 16 such that the cover element 20 is prevented from rotational movement within the clamping ring 28.

In a highly preferred embodiment, the particular ratio between the axial length of the tubular portion 16 and the thickness of the contoured bead 18 is about 2:1 when the length of the tubular portion 16 is about 20 millimeters. Such dimensions enable a closure system structure of minimal space to be constructed and also takes into consideration material flow limits in the blow molding process.

Operation of the Preferred Embodiment

During operation and use, the fuel tank assembly 8 is subjected to temperature variations which result both in the expansion and contraction of its individual parts, and changes in the fuel level within the container 10 result in repeated swelling from absorption and shrinkage from drying of the sealing ring 30. In light of such, the clamping ring 28 includes, at its contact surface which engages the flange 26, the chamfer 32 which causes the clamping and engagement force applied to the flange 26 to increase as a result of radial expansion of the cover element 20 and/or swelling of the sealing ring 30. This ensures reliable sealing of the fuel tank assembly 8 under substantially all conditions and circumstances. As briefly alluded to hereinabove, the sealing ring 30 has a substantially L-shaped cross-section and is disposed in a gap between the cover element 20, the tubular portion 16, and the clamping ring 28. This particular disposition of the sealing ring 30 dictates that both the radial surfaces and the axial surfaces of the sealing ring 30 find respective abutment and sealing surfaces at the cover element 20, the tubular portion 16, and the clamping ring 28. As a result, sealing in the fuel tank assembly 8 is achieved in both axial and radial directions. With particular regard to the radial direction, the sealing ring 30 is mainly clamped between the cylindrical portion 24 of the cover element 20 and the clamping ring 28, while the sealing ring 30 is partially unrestricted in the axial direction toward the interior of the container 10 so that the sealing ring 30 can repeatedly swell (from absorption) and shrink (from drying) without sacrificing sealing effectiveness. Furthermore, the clamping ring 28 is structured such that the clamping and engagement force applied thereby is appropriately adjusted to thereby compensate for either the swelling or shrinking of the sealing ring 30.

The fuel tank assembly 8, according to the present invention, allows for a very compact design of the tubular portion 16 and the contoured bead 18. Such is particularly important for manufacturing purposes because, in the blow molding process, only an amount of material determined by the wall thickness of the blank is available for any structure projecting from a surface. That is, the further that a certain structure projects from a base surface, the more difficult it is to provide for uniform material distribution, particularly when complicated structures such as threads or the like are to be formed. Designing a tubular portion and a contoured bead in accordance with the present invention, however, substantially reduces such difficulties. In particular, it has been found that particularly good results as to material distribution and mechanical stability are obtained when the ratio of the axial length of the tubular portion 16 to the radial thickness of the contoured bead 18 is about 1:2 to about 3:1.

As briefly alluded to hereinabove, the fuel tank assembly 8 preferably provides that the cover element 20 and the clamping ring 28 include some means for preventing rotation relative to each other and/or relative to the container 10. In the preferred embodiment illustrated in FIG. 4, for example, such a rotation preventing means includes the projection 48, which is integral with the cover element 20, and the complementary recess 52 defined in the clamping ring 28. Preventing rotation of the cover element 20 is particularly important in order to ensure that any electrical wires and/or fuel conduits connected to the cover element 20 are neither damaged nor ruptured by rotation of the cover element 20. Furthermore, preventing rotation of the cover element 20 also ensures that the positioning of any fuel level indicator (which generally includes a mechanical lever sensor), which may be attached to and suspended from the cover element 20, is properly retained.

In summary, the present invention provides a fuel tank assembly which has minimal space requirements and which is both simple to manufacture and simple to assemble, especially when the tubular portion with the contoured bead is made integral with the container wall. The fuel tank assembly according to the present invention also enables easy mounting of, for example, a fuel pump module and/or a fuel filler pipe upon cover elements of the assembly. In addition, when the fuel tank assembly is fully and properly assembled, reduced fuel permeation, due to both radial and axial sealing, is successfully obtained under substantially all conditions. Furthermore, stringent industry requirements with respect to internal pressure resistance and cold flow resistance are successfully met with the present invention as well.

While the present invention has been described in what is presently considered to be the most practical and preferred embodiment and/or implementation, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel tank assembly for a motor vehicle, said fuel tank assembly comprising:
    a container having a wall portion and a tubular portion contiguous with and projecting outward from said wall portion, said tubular portion defining an opening in said wall portion and having a contoured bead projecting radially outward immediately adjacent the projected end of said tubular portion;
    a cover element demountably situated on said projected end of said tubular portion and removably situated over said opening in said container;
    a sealing ring removably disposed between said cover element and said tubular portion of said container; and
    a clamping ring removably snapped onto said contoured bead of said tubular portion;
        wherein said sealing ring is cooperatively clamped and sealingly disposed between said cover element, said tubular portion of said container, and said clamping ring when said clamping ring is snapped onto said contoured bead of said tubular portion.

2. The fuel tank assembly according to claim 1, wherein said container comprises blow-molded, thermoplastic material.

3. The fuel tank assembly according to claim 1, wherein said contoured bead is integral with said projected end of said tubular portion, and said tubular portion of said container is integral with said wall portion of said container.

4. The fuel tank assembly according to claim 1, wherein said cover element has a cylindrical portion capable of extending into said opening of said container such that said cylindrical portion is coaxially situated within said tubular portion of said container.

5. The fuel tank assembly according to claim 4, wherein said cover element has a flange projecting radially outward from said cylindrical portion; and
    wherein when said clamping ring is snapped onto said contoured bead of said tubular portion, said sealing ring is cooperatively clamped and sealingly disposed between said cylindrical portion of said cover element, said tubular portion of said container, and said clamping ring, and also said flange of said cover element is cooperatively clamped between said sealing ring and said clamping ring.

6. The fuel tank assembly according to claim 5, wherein said clamping ring has a contact surface including a chamfer for cooperatively clamping said flange of said cover element; and
    wherein when said clamping ring is snapped onto said contoured bead of said tubular portion, said chamfer causes the clamping force applied by said clamping ring to increase when said cover element experiences radial expansion and when said sealing ring experiences swelling.

7. The fuel tank assembly according to claim 1, wherein said sealing ring has a substantially L-shaped cross-section.

8. The fuel tank assembly according to claim 1, wherein said clamping ring has a cross-section including at least one separation slit defined therethrough.

9. The fuel tank assembly according to claim 8, wherein each said separation slit is substantially radially aligned.

10. The fuel tank assembly according to claim 1, said fuel tank assembly further comprising a fastenable strap removably encircling the outer radial periphery of said clamping ring for securing said clamping ring when said clamping ring is snapped onto said contoured bead of said tubular portion.

11. The fuel tank assembly according to claim 10, wherein said clamping ring has an annular groove defined in the outer radial periphery of said clamping ring for matingly receiving said fastenable strap.

12. The fuel tank assembly according to claim 1, wherein said clamping ring has a lower portion and an inclined surface defined in the inner radial periphery of said lower portion for initially slipping said lower portion of said clamping ring over said contoured bead of said tubular portion so as to ultimately facilitate the snapping of said clamping ring onto said contoured bead of said tubular portion.

13. The fuel tank assembly according to claim 1, wherein said clamping ring has an annular groove defined in the inner radial periphery of said clamping ring for snapping said clamping ring onto said contoured bead of said tubular portion in a complementary fashion.

14. The fuel tank assembly according to claim 1, wherein the axial length of said tubular portion and the radial thickness of said contoured bead define a ratio having a range from about 1:2 to about 3:1.

15. The fuel tank assembly according to claim 1, wherein said sealing ring comprises elastomeric material adapted to swell when fuel is absorbed.

16. The fuel tank assembly according to claim 1, wherein said cover element has a projection integral with the outer radial periphery of said cover element, and said clamping ring has a complementary recess defined in the inner radial periphery of said clamping ring; and
    wherein said projection of said cover element and said recess of said clamping ring fit together when said clamping ring is snapped onto said contoured bead of said tubular portion such that said cover element is prevented from rotational movement within said clamping ring.

17. The fuel tank assembly according to claim 1, wherein said cover element includes a fuel pump module.

18. The fuel tank assembly according to claim 17, wherein said fuel pump module includes a conduit for transferring fuel from said container.

19. The fuel tank assembly according to claim 1, wherein said cover element includes a pipe for transferring fuel into said container.

20. A fuel tank assembly for a motor vehicle, said fuel tank assembly comprising:

a container having a wall portion and a tubular portion contiguous with and projecting outward from said wall portion, said tubular portion defining an opening in said wall portion and having a contoured bead projecting radially outward immediately adjacent the projected end of said tubular portion;

a cover element, demountably situated on said projected end of said tubular portion and removably situated over said opening in said container, having a cylindrical portion, capable of extending into said opening, and a flange projecting radially outward from said cylindrical portion;

a sealing ring removably disposed between said cylindrical portion of said cover element and said tubular portion of said container; and a clamping ring removably snapped onto said contoured bead of said tubular portion;

wherein when said clamping ring is snapped onto said contoured bead of said tubular portion, said sealing ring is cooperatively clamped and sealingly disposed between said cylindrical portion of said cover element, said tubular portion of said container, and said clamping ring, and also said flange of said cover element is cooperatively clamped between said sealing ring and said clamping ring.

* * * * *